United States Patent
Doelling et al.

(10) Patent No.: US 6,343,468 B1
(45) Date of Patent: Feb. 5, 2002

(54) METHOD AND DEVICE FOR CONTROLLING A COMBUSTION SYSTEM AND FOR CATALYTIC CLEANING OF EXHAUST GAS, AND COMBUSTION SYSTEM

(75) Inventors: Winfried Doelling, Weissenbrunn; Lothar Hofmann, Altenkunstadt; Wieland Mathes, Michelau, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/369,716

(22) Filed: Aug. 6, 1999

Related U.S. Application Data (63) Continuation of application No. PCT/DE98/00202, filed on Jan. 22, 1998.

(30) Foreign Application Priority Data

Feb. 6, 1997 (DE) .......................................... 197 04 558

(51) Int. Cl.[7] ................................................ F01N 3/00
(52) U.S. Cl. .............................. 60/286; 60/274; 60/285; 60/303
(58) Field of Search .......................... 60/274, 286, 301, 60/303, 295, 277, 285

(56) References Cited

U.S. PATENT DOCUMENTS

| | | | |
|---|---|---|---|
| 5,406,790 A | * 4/1995 | Hirota et al. ................. | 60/276 |
| 5,560,202 A | 10/1996 | Hosoya et al. | |
| 5,628,186 A | * 5/1997 | Schmelz ...................... | 60/274 |
| 5,788,936 A | * 8/1998 | Subramanian et al. ... | 423/213.2 |
| 5,842,341 A | * 12/1998 | Kibe ............................ | 60/274 |
| 6,105,365 A | * 8/2000 | Deeba et al. ................. | 60/274 |
| 6,119,448 A | * 9/2000 | Emmerling et al. .......... | 60/274 |
| 6,151,547 A | * 11/2000 | Kumar et al. ................ | 701/101 |

FOREIGN PATENT DOCUMENTS

| | | |
|---|---|---|
| DE | 37 21 572 A1 | 2/1988 |
| DE | 42 27 741 A1 | 2/1994 |
| DE | 43 34 865 A1 | 4/1995 |
| DE | 196 29 163 C1 | 10/1997 |
| EP | 0 697 062 B1 | 2/1996 |

OTHER PUBLICATIONS

Patent Abstracts of Japan No. 07–103021 (Toshiyuki), dated Apr. 18, 1995.

Patent Abstracts of Japan No. 55–093017 (Hideo), dated Jul. 16, 1980.

* cited by examiner

*Primary Examiner*—Thomas Denion
*Assistant Examiner*—Binh Tran
(74) *Attorney, Agent, or Firm*—Herbert L. Lerner; Laurence A. Greenberg; Werner H. Stemer (57) ABSTRACT

A method and a device for controlling a combustion system, in particular an internal combustion engine, and for catalytic cleaning of exhaust gases, as well as a combustion system, catalytically remove a noxious substance from the exhaust gas with the aid of a fluid which is added in a metered manner to the noxious substance. A desired value for a mass flow of the noxious substance in the exhaust gas is prescribed in order to control the combustion system. In this way, the metered addition of the fluid in accordance with the mass flow of the noxious substance is substantially simplified.

9 Claims, 6 Drawing Sheets

METHOD AND DEVICE FOR CONTROLLING A COMBUSTION SYSTEM AND FOR CATALYTIC CLEANING OF EXHAUST GAS, AND COMBUSTION SYSTEM

CROSS-REFERENCE TO RELATED APPLICATION

This application is a continuation of copending International Application No. PCT/DE98/00202, filed Jan. 22, 1998, which designated the United States.

BACKGROUND OF THE INVENTION

FIELD OF THE INVENTION

The invention relates to a method and a device for controlling a combustion system and for catalytic removal from exhaust gas of a noxious substance generated by the combustion system, in which the noxious substance reacts chemically with a fluid that is added to the exhaust gas in a metered manner. Such a reaction is, for example, the reaction of nitrogen oxides with a reducing agent such as ammonia to form nitrogen and water, which occurs in so-called deNOx catalytic converters. The invention also relates to a combustion system, in particular an internal combustion engine, which is equipped with such a device.

During the combustion of a fossil fuel in a combustion system, noxious substances such as nitrogen oxides, hydrocarbons, carbon monoxide and sulfur oxides are produced and, at appropriate combustion temperatures, dioxines and furanes as well, which can pass into the environment through the exhaust gas of the combustion system. Such a combustion system can, for example, be a boiler system, a fossil-fuel power plant or an internal combustion engine.

Due to strict legal requirements which limit the exhaust gas quantity of the above-mentioned noxious substances, additional treatment of the exhaust gases is necessary for the above-mentioned combustion systems in order to reduce the noxious substances contained in the exhaust gases. In the past, a number of catalytic converters have been developed for that purpose. For example, the deNOx catalytic converters already mentioned are known for reducing nitrogen oxides. The catalytic converters convert the nitrogen oxides contained in the exhaust gas by using a suitable reducing agent, usually ammonia, according to the method of selective catalytic reduction (SCR), to form environmentally friendly nitrogen and water. The reducing agent or a precursor of the reducing agent, for example urea as a precursor of ammonia, is introduced into the exhaust gas upstream of the catalytic converter, in flow direction of the exhaust gas, and then enters the catalytic converter in a preferably homogeneous mixture with the nitrogen oxides contained in the exhaust gas.

In order to reduce the noxious substances in the exhaust gas of an Otto or spark-ignition engine, noble metal-containing catalytic converters, for example, are known, in which hydrocarbons and carbon monoxide are converted by using nitrogen oxides to form carbon dioxide, nitrogen and/or water.

Furthermore, work is currently under way at many locations on the development of a regulated diesel catalytic converter with which it is to be possible to considerably reduce the nitrogen oxide content in the exhaust gas of a diesel engine. However, due to the high residual content of atmospheric oxygen in the exhaust gas, that is not possible with the noble metal-containing catalytic converter known for the Otto or spark-ignition engine. Instead, the already mentioned deNOx catalytic converter can be used to remove nitrogen oxide from the exhaust gas of a diesel engine. However, since a diesel engine is usually operated with variable load and variable rotational speed, in particular when it is used to provide traction, the quantity of nitrogen oxide generated per unit time is subject to fluctuation within wide limits. The same also applies, of course, to any other combustion system which is used with changing operating conditions.

On one hand, in order to achieve a high rate of precipitation of the nitrogen oxides and, on the other hand, to prevent a slip of the introduced reducing agent, the reducing agent must be metered precisely to the generated quantity of nitrogen oxides through the use of suitable measures in accordance with the stoichiometry of the reaction. An aggravating factor is that the ammonia which is used as a reducing agent is poisonous and even a small concentration constitutes a considerable olfactory nuisance for humans. Precise metering is also necessary with other catalytic cleaning methods in which a noxious substance reacts as a first reactant, with a fluid which has been additionally introduced into the exhaust gas as a second reactant.

Such precise metering of the fluid is associated with a considerable technical outlay since, in addition to monitoring the generated quantity of noxious substance, it is also necessary to additionally take parameters which relate to the operation of the combustion system into account. Those parameters are, for example, temperature and load, parameters which relate to the operation of the catalytic converter, for example catalytic converter temperature and storage capacity, and exhaust-gas parameters, for example pressure and temperature. A method for the controlled introduction of a fluid into a nitrogen oxide-containing exhaust gas, which takes the afore said parameters into account, is known from European Patent EP 0 697 062 B1, corresponding to U.S. Pat. No. 5,628,186. It is disadvantageous that the metering system which is necessary for the introduction of the fluid must be configured for a wide throughput range of the fluid and must have a highly dynamic configuration in order to function satisfactorily in every operating state of the combustion system. Such a metering system entails high costs, since it has to be adapted to the respective system.

SUMMARY OF THE INVENTION

It is accordingly an object of the invention to provide a method and a device for controlling a combustion system and for catalytic cleaning of exhaust gases, as well as a combustion system, which overcome the hereinafore-mentioned disadvantages of the heretofore-known methods and devices of this general type, which are technically simpler and more cost-effective than the prior art, in which a fluid is added to the exhaust gas in a metered manner and which thus achieve a high precipitation rate of a noxious substance without an appreciable slip of a fluid or of a product of the fluid.

With the foregoing and other objects in view there is provided, in accordance with the invention, a method for controlling a combustion system and for catalytic removal from exhaust gas of a noxious substance generated in the combustion system, which comprises controlling combustion in the combustion system to adjust a constant desired value for a mass flow of the noxious substance or a desired value for the mass flow of the noxious substance linearly dependent on at least one variable characterizing an operational state; and metering an addition of a fluid to the exhaust gas to correspond to the desired value for the mass flow of the noxious substance.

The invention is based in this case on the concept that the mass flow rate of the noxious substance produced during the combustion is dependent to a high degree on the conditions, such as pressure and temperature, for example, prevailing during the combustion. The mass flow rate of the noxious substance is defined in this case as the throughflow rate of the noxious substance per time unit, measured in kg/sec. The combustion can accordingly be controlled in accordance with a prescribed desired value for the mass flow rate of the noxious substance. Of course, controlling the combustion in such a way also makes it possible to regulate the mass flow rate, i.e. to set the value of the mass flow rate within a certain tolerance range about a prescribed desired value. Since, in this way, the mass flow rate no longer changes within wide limits, particularly under changing operating conditions of the combustion system, the metering of the fluid which is necessary for the catalytic removal of the noxious substance from the exhaust gas can be substantially simplified. It is specifically configured only for a very small throughput range of the fluid in accordance with the desired value of the mass flow rate of noxious substance and optimized for this range. The highly dynamic configuration of the metering device is eliminated.

In accordance with another mode of the invention, the combustion can be controlled by influencing the air quantity fed to the combustion and/or the fuel quantity fed to the combustion. This controls the temperature prevailing during the combustion. That temperature constitutes a significant parameter for the quantity of noxious substances being produced.

It is known that during the combustion of a fossil fuel, a slight reduction in the temperature prevailing during the combustion results in a drastic reduction in the quantity of nitrogen being produced. In the case of an internal combustion engine, it is possible, in particular by adjusting the fuel/air mixture fed to the combustion, to bring about a change in the combustion temperature without incurring a reduction in performance in the process. In the case of an internal combustion engine, the fuel/air mixture can be adjusted in an easy mechanical manner through the use of a throttle flap located in the air intake. The fuel/air mixture can also be adjusted directly by electronic or mechanical measures using a carburetor.

In accordance with a further mode of the invention, in an internal combustion engine the combustion is controlled by influencing the ignition time and/or the feed or injection time of the fuel. The start of combustion can be moved in terms of timing in this way. Usually, the start of combustion is ahead of the so-called upper dead center i.e. the upper reversal point of the piston. If, on one hand, the start of combustion is moved forwards in terms of timing, the combustion takes place in a compression region, i.e. at a relatively high temperature and a relatively high pressure, which results in large amounts of nitrogen oxides being generated. If, on the other hand, the start of combustion is moved back in terms of timing, the combustion takes place in an expansion region, i.e. at a relatively low temperature and a relatively low pressure. Relatively few nitrogen oxides are generated. In modern engines, with injection equipment, such control is possible without a loss in performance and the same, or an improved, fuel consumption. On one hand, in an auto-ignition diesel engine, the combustion point can be adjusted solely by adjusting the time at which the fuel is fed in or injected. on the other hand, in an Otto or spark-ignition engine, the combustion is controlled by influencing the ignition time.

In terms of the configuration of the metering device for the introduction into the exhaust gas of the fluid which is necessary for the catalysis, it is advantageous if a constant desired value is prescribed for the mass flow of the noxious substance in the exhaust gas. In this case, the metering device can have a particularly simple configuration, and is specifically configured solely for a narrow throughput range.

In this way, an inexpensive series production of the metering device is possible. Such a regulating system is readily possible, for example, in modern engines with electronic engine management.

In terms of a combustion system for which it is not possible to control the mass flow of a noxious substance in accordance with a constant desired value due to the structural layout or to other peripheral conditions, it is advantageous if a desired value prescribed for the mass flow has a linear dependence on a variable which characterizes the operating state of the combustion system. Such a variable which characterizes the operating state can, for example, be the load or, in the case of an internal combustion engine, the engine speed. In the case of a combustion system with unregulated mass flow of the noxious substance to be removed, a small change in a variable characterizing the operating state, for example the temperature, can result in a large change in the mass flow. Therefore, a regulating system with a linearly adapted desired value already constitutes a significant improvement in terms of the configuration of the metering device. It is also conceivable for a desired value which is prescribed for the mass flow of the noxious substance to be removed, to have a linear dependence on a plurality of variables which characterize the operating state of the combustion system.

With the objects of the invention in view there is also provided, in a combustion system having an exhaust gas duct for conducting exhaust gas, a device for metered addition of a fluid to the exhaust gas, and a catalytic converter in the exhaust gas duct for converting a noxious substance by using the fluid, a device for controlling the combustion system and for catalytic removal of the noxious substance from the exhaust gas, comprising a device for determining a mass flow of the noxious substance; a control line connected to the combustion system; and a control unit for forming a constant desired value for the mass flow of the noxious substance or a desired value for the mass flow of the noxious substance linearly dependent on at least one variable characterizing an operational state of the combustion system, the control unit connected to the device for the metered addition of the fluid and to the device for determining the mass flow, the control unit having a terminal connected to the control line, and the control unit regulating the mass flow for controlling the combustion of the combustion system corresponding to the desired value for the mass flow and for a metered addition of the fluid corresponding to the mass flow.

In accordance with another feature of the invention, the device for determining the mass flow of the noxious substance is a measuring device for measuring the mass flow. The measuring device is disposed in the exhaust gas duct upstream of the catalytic converter in flow direction of the exhaust gas. However, it is also possible to store a characteristic diagram in an electronic memory. The mass flow of the noxious substance can be obtained from the characteristic diagram as a function of the respective operating state of the combustion system. In this case, the device for determining the mass flow includes a device for sensing the operating state, for example by measuring parameters which are relevant to operation, such as load or fuel consumption, the aforesaid electronic memory and a computer unit for reading out the characteristic diagram from the memory.

Such a device for cleaning exhaust gases can be connected directly to an existing exhaust gas line of a combustion system or integrated directly into the exhaust gas line.

The control unit may be provided with an electronic memory in order to store the determined measured values of the mass flow of noxious substances. In such a memory, the desired value for the mass flow, or in the case of a linearly dependent desired value, a prescribed characteristic curve or a prescribed characteristic diagram for calculating the desired value from one or more variables characterizing the operating state of the combustion system, may be stored. In order to control the combustion system, the control unit may also be equipped with a microchip, which calculates an appropriate control signal for the combustion system from the difference between the measured actual value of the mass flow and the desired value to be regulated, or obtains an appropriate control signal from a stored file. Depending on the regulated desired value, the control unit is also suitable for metering into the exhaust gas an appropriate quantity of the fluid which is necessary for the catalytic removal of the noxious substance.

In accordance with a further feature of the invention, the control line adjusts an air quantity and/or fuel quantity which can be fed to the combustion.

In accordance with an added feature of the invention, in terms of the cleaning of an exhaust gas of an internal combustion engine having a combustion which, as is known, occurs cyclically, the control line influences an ignition time and/or a feed time of the fuel. Such a control line can be constructed, for example, as an electronic control cable, which, in modern internal combustion engines, can be coupled directly to an existing piece of electronic injection equipment.

With the objects of the invention in view there is additionally provided a combustion system, in particular an internal combustion engine, having a device for controlling the combustion system and for the catalytic removal of a noxious substance contained in the exhaust gas, as described above.

Other features which are considered as characteristic for the invention are set forth in the appended claims.

Although the invention is illustrated and described herein as embodied in a method and a device for controlling a combustion system and for catalytic cleaning of exhaust gases, as well as a combustion system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
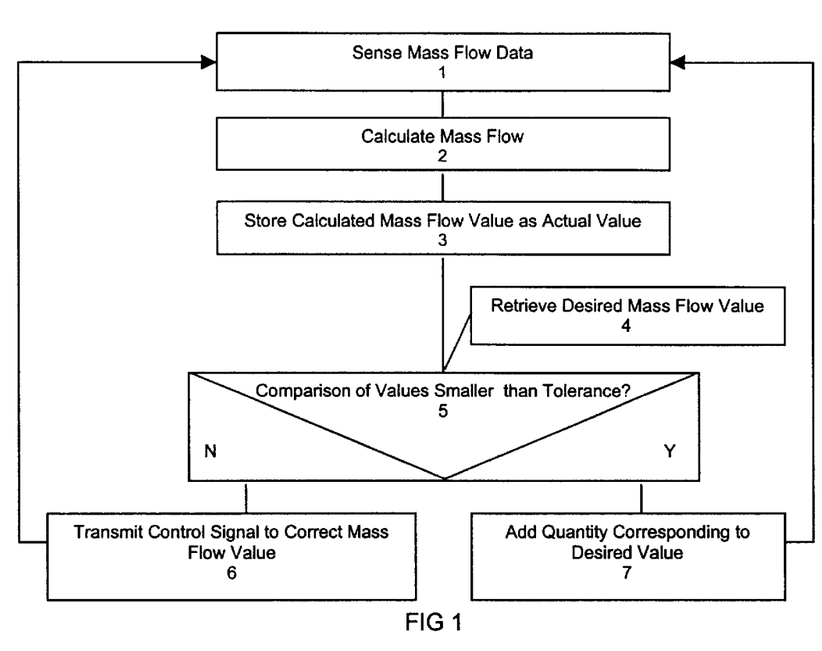
FIG. 1 is a first flowchart for a regulation of a mass flow of a noxious substance of a combustion system.

Referring now to the figures of the drawings in detail and first, particularly, to FIG. 1 thereof, there is seen a flowchart, with the aid of which a method for regulating a mass flow or mass flow rate of a noxious substance of a combustion system to a constant desired value will be explained. In a first method step 1, data for calculating the mass flow of the noxious substance are sensed through the use of a measuring device. The measuring device is equipped, for example, with sensors for measuring the concentration of noxious substances and for measuring the flow rate of the exhaust gas. The mass flow can then be calculated from the sensed data in a method step 2. It is also possible to store a characteristic diagram in an electronic memory. The mass flow of the noxious substance can be obtained from the characteristic diagram as a function of a respective operating state of the combustion system. In the case of an internal combustion engine, such a characteristic diagram can be determined on a test bench. That is done, for example, by a simultaneous measurement of parameters, such as rotational speed, load (torque), charging air temperature, charging pressure or fuel consumption, which characterize the operating state of the internal combustion engine, and measurement of the mass flow of the noxious substance. However, the mass flow can also be approximated from the aforesaid parameters and the concentration of the noxious substance in the exhaust gas of the internal combustion engine. When a characteristic diagram is used, at least one parameter characterizing the operating state of the combustion system is measured in the method step 1, and the value of the mass flow of the noxious substance is determined from the parameter with the aid of the characteristic diagram in the method step 2. The calculated value of the mass flow is stored as an actual value in a method step 3.

In a method step 4, the desired value for the mass flow, which is a value that is prescribed as a function of the combustion system and is implemented, for example, in a memory, is called-up or retrieved. The sensed and stored actual value of the mass flow is then compared with the called-up desired value of the mass flow in a method step 5. If a difference between the measured actual value and the stored desired value is smaller than a prescribed tolerance value, a decision Y is made. In that case, a quantity of fluid corresponding to the prescribed desired value of the mass flow of the noxious substance is added in a metered manner to the exhaust gas as a function of a method step 7. The fluid reacts with the noxious substance in a catalytic converter. Then, the steps 1 to 7 are repeated. If the difference between the actual value and the desired value of the mass flow is greater than the prescribed tolerance value, a decision N is made. In that case, a corresponding control signal is transmitted to the combustion system in a following method step 6 in order to correct the value of the mass flow.

Such a control signal can, for example, be an electronic signal which starts directly at a piece of electronic injection equipment of an internal combustion engine and, for example, changes the ignition time or injection time. The entire method may proceed in either a discrete or continuous manner.

Figure 2:
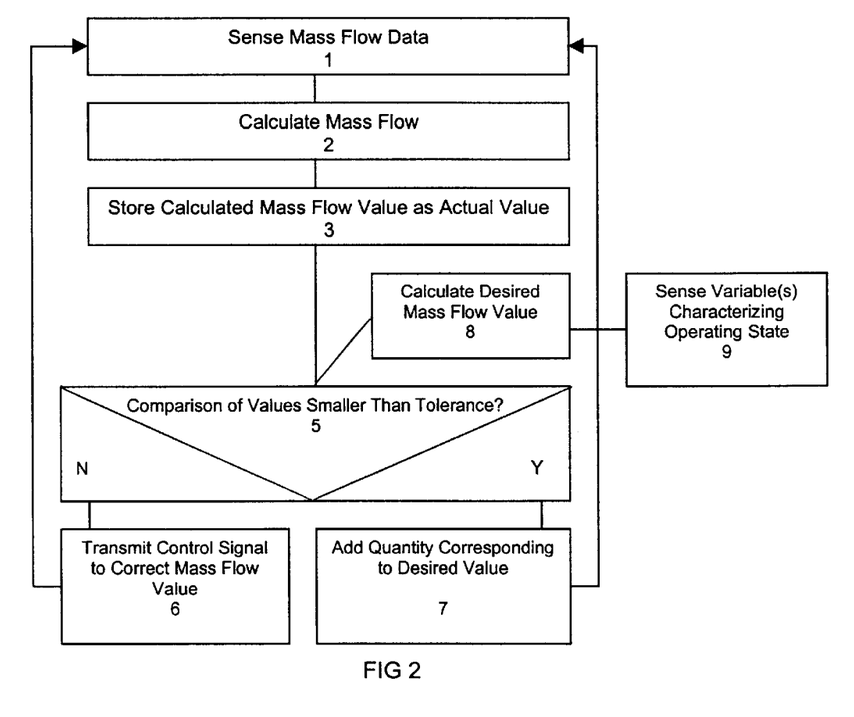
FIG. 2 is a second flowchart for a regulation of a mass flow of a noxious substance of a combustion system.

FIG. 2 relates to a method for regulating the mass flow of the noxious substance to be removed to a desired value which has a linear dependence on a variable characterizing the operating state of the combustion system. Such a variable characterizing the operating state can, for example, be the rotational speed, the control rod travel or the load of an internal combustion engine. Other variables are also conceivable. In comparison to the method illustrated in FIG. 1, the method illustrated in FIG. 2 differs only in that the method step 4, i.e. the calling-up of a prescribed desired value, is eliminated and replaced by method steps 8 and 9. In the method step 9, in order to determine the desired value of the mass flow of the noxious substance, one or more variables characterizing the operating state are sensed, for example by measuring. In the method step 8, the desired mass flow value to be regulated is calculated in accordance with a prescribed characteristic curve or characteristic diagram that is stored, for example, in an electronic memory. Through the use of this mass-flow desired value, which is respectively adapted to the current operating state, the comparison between the measured actual value and the prescribed desired value of the mass flow is carried out in the method step 5, as was already described for FIG. 1.

Figure 3:
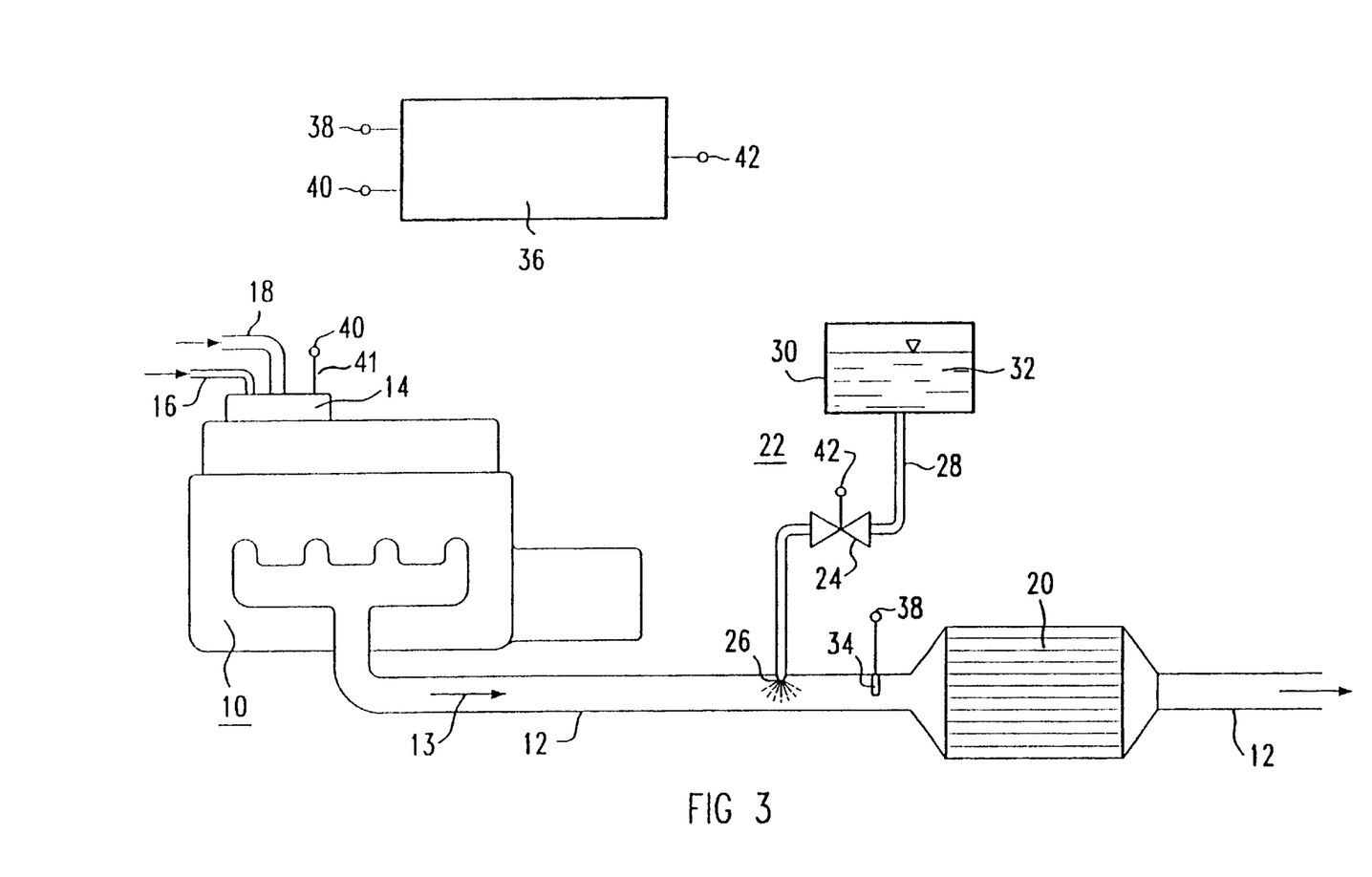
FIG. 3 is a schematic and diagrammatic view of a diesel engine with a device connected for a catalytic removal of nitrogen oxides from an exhaust gas, in which a mass flow of nitrogen oxides is regulated.

FIG. 3 shows a combustion system 10 in the form of a diesel engine which is provided with a device for cleaning exhaust gases in order to remove nitrogen oxides by controlling the mass flow of the nitrogen oxides to a constant desired value. The diesel engine has a piece of electronic injection equipment 14 with a fuel feed line 16 and an air intake line 18. Exhaust gas 13 which is produced in the diesel engine during fuel combustion is conducted to the outside through an exhaust gas duct 12 and through a catalytic converter 20, which is integrated into the exhaust gas duct 12. In this case, the catalytic converter 20 is constructed as a so-called deNOx catalytic converter, which decomposes nitrogen oxides in accordance with the known SCR method using a reducing agent such as ammonia to form molecular nitrogen and water. The required quantity of ammonia is acquired through the use of hydrolysis from urea which has been added in a metered manner. The urea corresponds in this case to a fluid 32, which is necessary to remove the noxious substance, which is to be additionally introduced into the exhaust gas 13 and which reacts chemically with the noxious substance.

In order to provide the metering of urea, provision is made for a metering device 22, which includes a reservoir vessel 30, a feed line 28, a metering valve 24 and an injection nozzle 26. The metering valve 24 can be actuated electronically through a terminal 42. In order to carry out the hydrolysis of the urea, a non-illustrated hydrolysis catalytic converter may additionally be provided in the exhaust gas duct 12 downstream of the injection nozzle 26. A measuring device 34 for sensing the mass flow of the nitrogen oxides is also provided in the exhaust gas duct 12 of the diesel engine 10. This measuring device includes sensors for determining the concentration of the nitrogen oxides and for determining the flow rate of the exhaust gas. The data which is measured by the measuring device 34, for calculating the mass flow of the nitrogen oxides, can be acquired through a terminal 38.

In order to regulate the mass flow of the nitrogen oxides, a control unit 36 is provided which uses the terminal 38 to acquire the data recorded through the use of the measuring device 34 and calculate the mass flow of the nitrogen oxides from the data. The control unit is also connected through a terminal 40 to a control line 41 leading to the piece of electronic injection equipment 14 of the diesel engine, in order to control the combustion.

If the calculated actual value of the mass flow of the nitrogen oxides lies outside a prescribed tolerance range and above the prescribed desired value for the mass flow of the nitrogen oxides, the injection time of the diesel engine is moved into the expansion region, i.e. moved back in terms of timing, through the terminal 40 with the aid of an electronic control signal. In this way, the quantity of nitrogen oxide being emitted is reduced due to the reduced pressure and the decreased temperature. In a correspondingly inverted manner, the injection time is moved forwards in terms of time if the actual value of the mass flow of the nitrogen oxides lies outside the prescribed tolerance range but below the prescribed desired value. In a modern diesel engine with injection equipment, the described regulating method is possible without any loss of performance and without a higher consumption of fuel.

Figure 4:
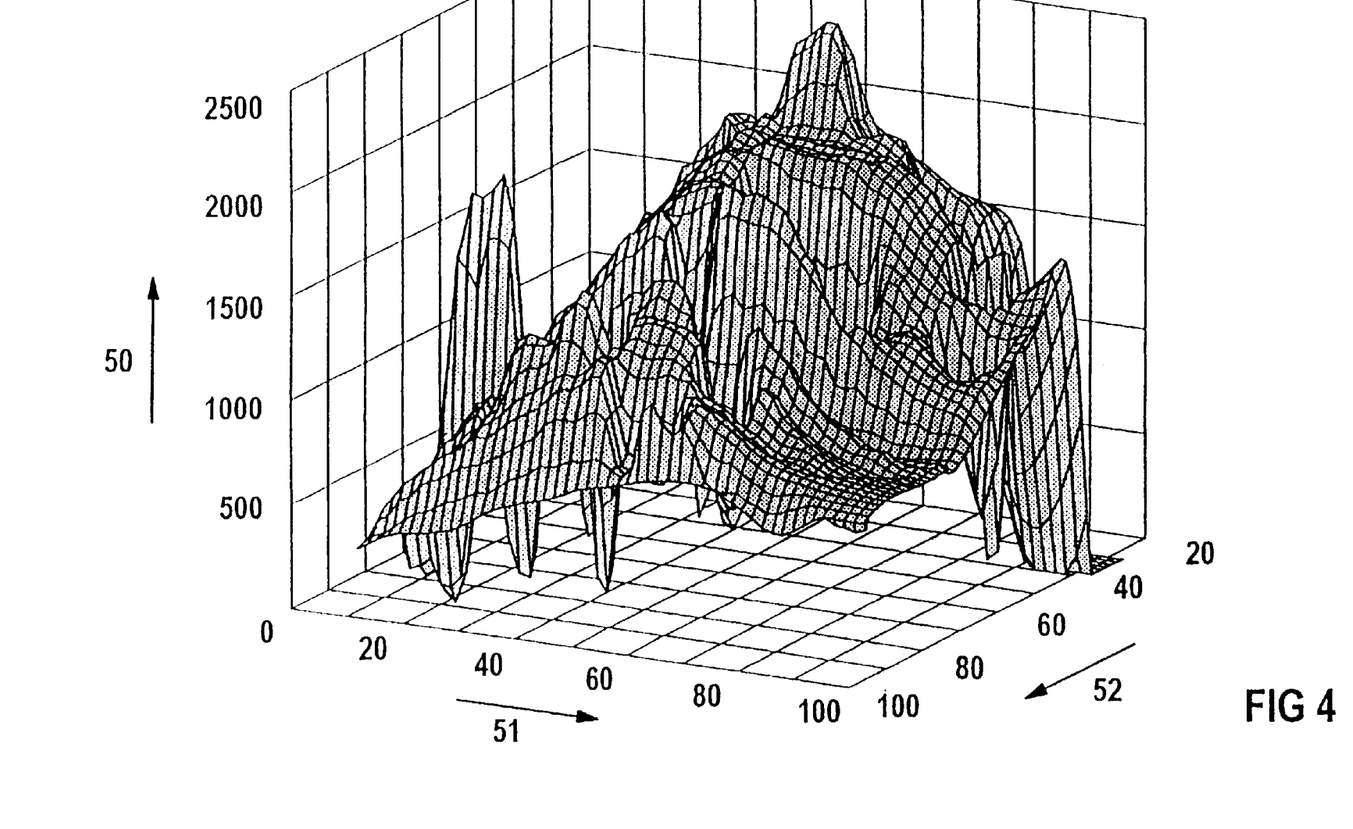
FIG. 4 is a graph showing a profile of the mass flow of the nitrogen oxides in an exhaust gas of an internal combustion engine as a function of rotational speed and of load in an unregulated state.

FIGS. 4 to 7 each show a mass flow or mass flow rate 50 of the nitrogen oxides in the exhaust gas of an internal combustion engine as a function of a rotational speed 51 and of a load 52 of the internal combustion engine. The mass flow 50 is plotted in this case in g/h and the rotational speed 51 and the load 52 are each plotted as % of a design value. If the mass flow 50 in accordance with FIG. 4 is not regulated, it becomes clear that a method which is intended to be used to add a fluid in a metered manner to the exhaust gas as a function of the unregulated mass flow of the nitrogen oxides can only be realized with technical difficulty. In order to do this, the metering device for the metered introduction of the fluid into the flow of exhaust gas must, in fact, have a highly dynamic configuration and be configured so as to operate precisely in further operating ranges of the internal combustion engine, due to the large fluctuation range of the mass flow 50. In addition, a device for metering the fluid as a function of the rotational speed 51 or the load 52 cannot be tailored precisely to the mass flow 50, since a small change in the rotational speed 51 or in the load 52 can result in a large change in the mass flow 50.

Figure 5:
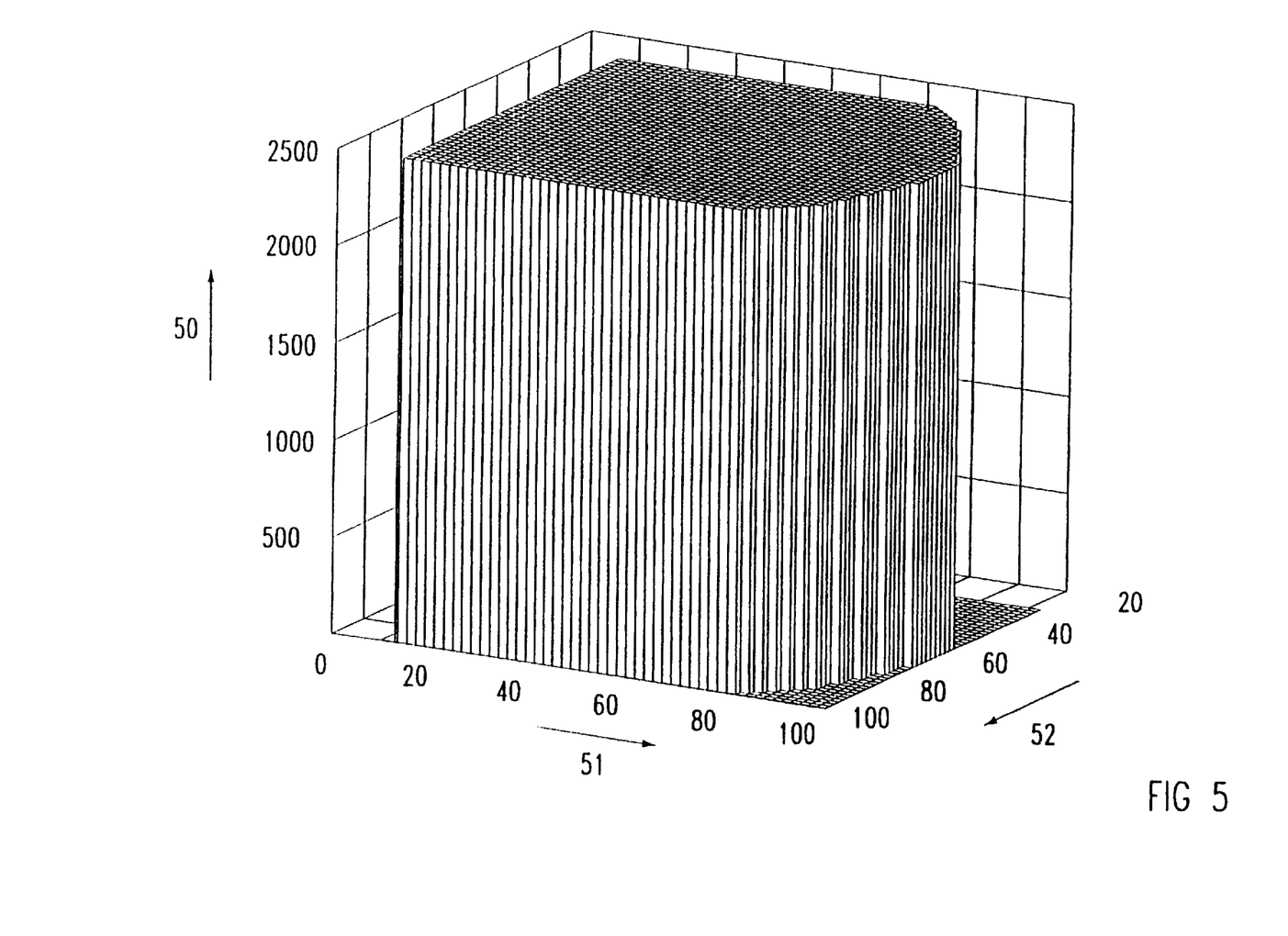
FIG. 5 is a graph showing a profile of the mass flow of the nitrogen oxides in the exhaust gas of an internal combustion engine as a function of the rotational speed and of the load with regulation to a constant desired value.

In contrast, in FIG. 5, the mass flow 50 of the aforementioned noxious substance is regulated to a constant desired value by controlling the combustion of the combustion system. The mass flow of the noxious substance remains approximately constant independently of the rotational speed 51 and of the load 52. It becomes clear that, with such a regulating system, having a technical implementation which is relatively easy for an internal combustion engine with the injection equipment, it is possible to configure the metering device for introducing the fluid for only a small throughput range, and thus to configure it in a cost-effective way. The manufacture of such a metering device is possible in inexpensive series production.

Figure 6:
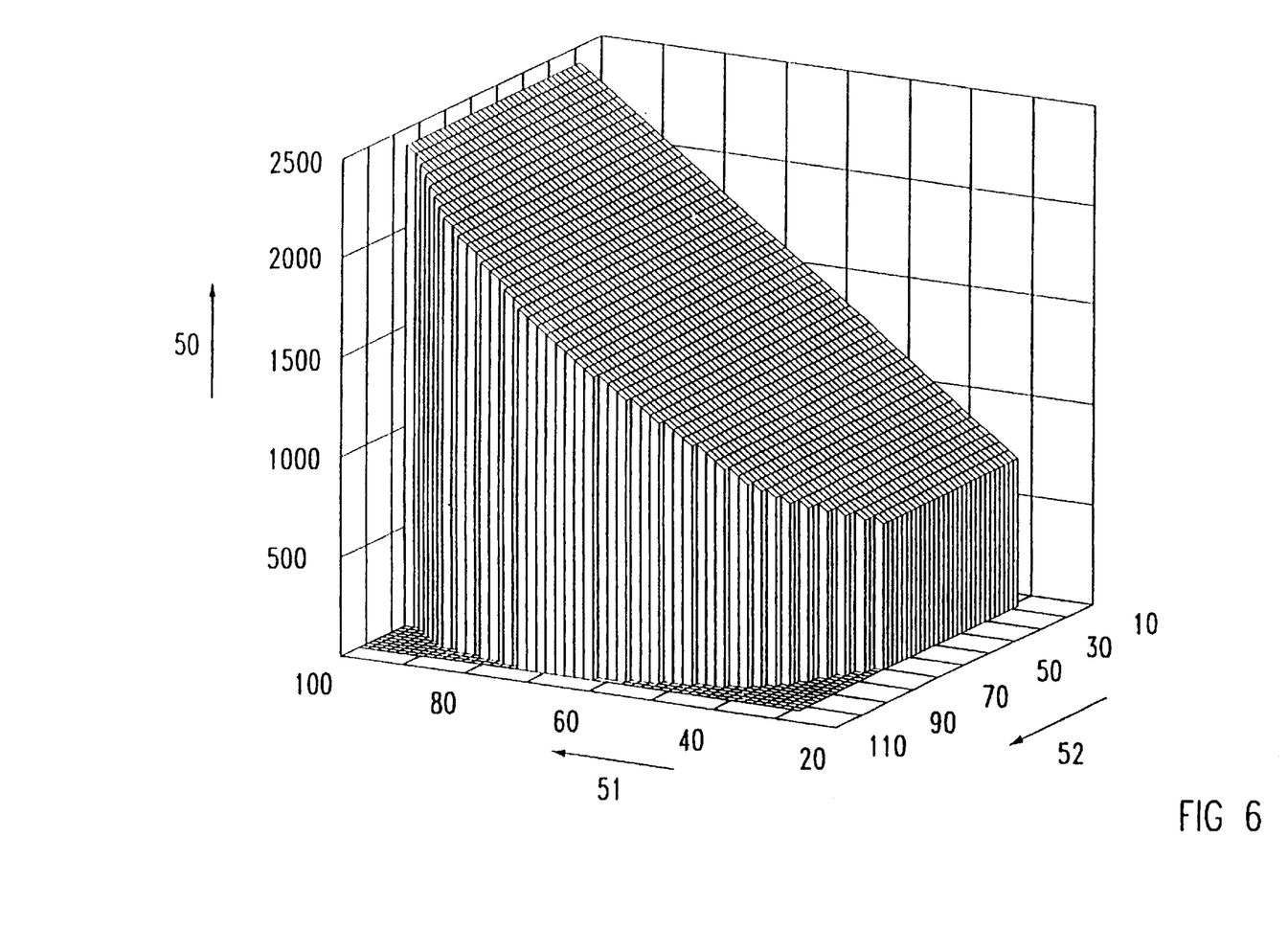
FIG. 6 is a graph showing a profile of the mass flow of the nitrogen oxides in the exhaust gas of an internal combustion engine as a function of the load and of the rotational speed with regulation to a desired value which is linear with respect to the load.
Figure 7:
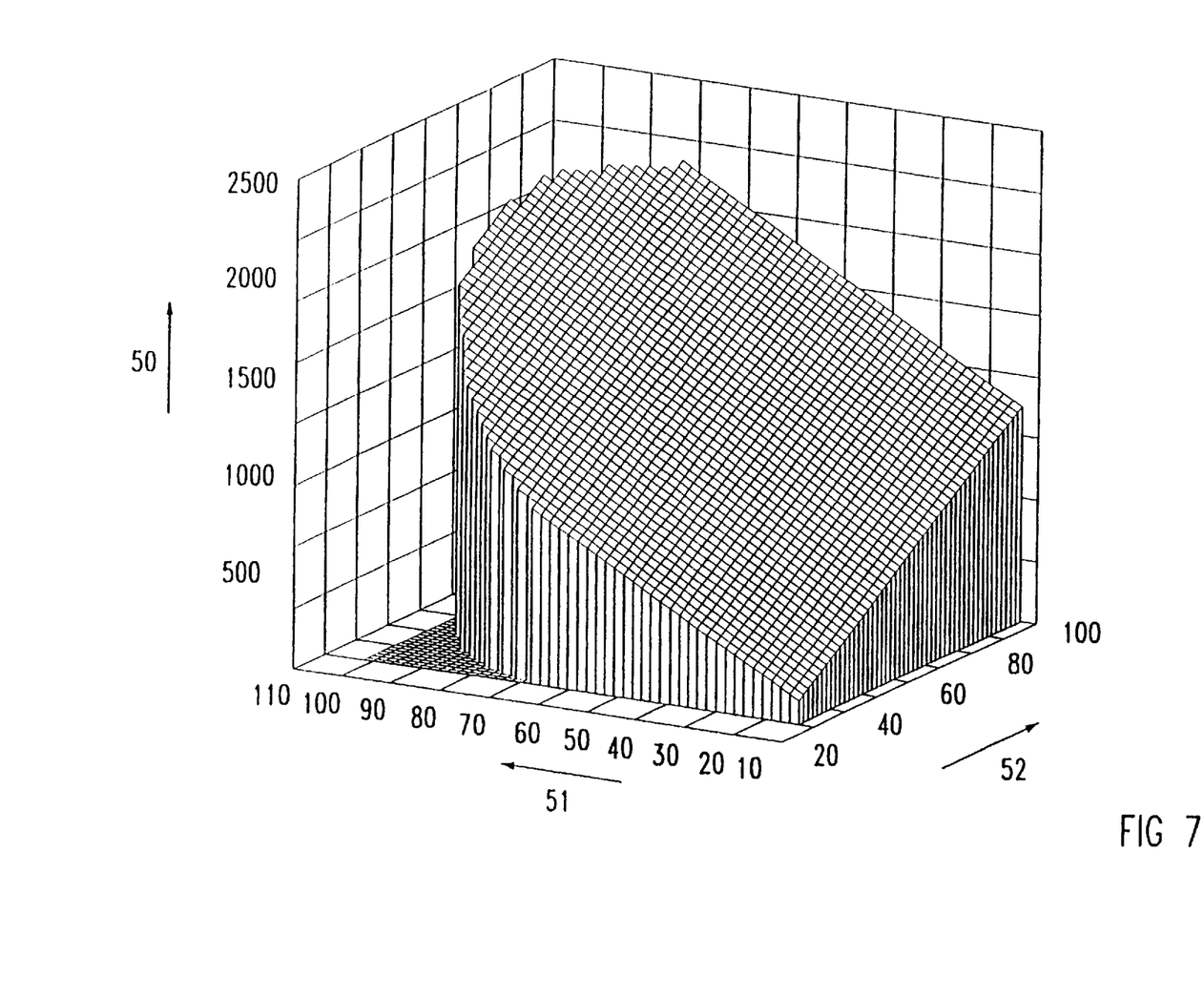
FIG. 7 is a graph showing a profile of the mass flow of the nitrogen oxides in the exhaust gas of an internal combustion engine as a function of the rotational speed and of the load with regulation to a desired value which is linear with respect to the load and to the rotational speed.

If, due to its structural features, an internal combustion engine cannot be controlled in such a way that it is possible to regulate the mass flow 50 of the nitrogen oxides to a constant desired value, the mass flow 50 can be regulated to a desired value which has a simple linear dependence on one or more variables characterizing the operating state. This is usually possible for relatively old engines. For example, FIG. 6 shows a way of regulating the mass flow 50 to a desired value which has a linear dependence on the load 51 of the internal combustion engine. FIG. 7 shows a way of regulating the mass flow 50 to a desired value, in which the desired value has a linear dependence on the rotational speed 51 and on the load 52. In the two cases shown, the metering device can also have a substantially more cost-effective construction than would be necessary for metering a fluid in accordance with an unregulated mass flow. It is also possible to achieve a high level of metering accuracy since, due to the linear relationship, a change in the rotational speed 51 or in the load 52 results in a change in the mass flow 50 by the same factor.

We claim:

1. In a method for controlling a combustion system and for catalytic removal from exhaust gas of a noxious substance generated in the combustion system, the improvement which comprises:

controlling combustion in the combustion system to adjust a constant desired value for a mass flow of the noxious substance or a desired value for the mass flow of the noxious substance linearly dependent on at least one variable characterizing an operational state; and metering an addition of a fluid to the exhaust gas to correspond to the desired value for the mass flow of the noxious substance.

2. The method according to claim 1, which comprises carrying out the step of controlling the combustion by influencing at least one of an air quantity and a fuel quantity fed to the combustion.

3. The method according to claim 1, which comprises carrying out the step of controlling the combustion by influencing at least one of an ignition time and a fuel feed time of an internal combustion engine.

4. In a combustion system having an exhaust gas duct for conducting exhaust gas, a device for metered addition of a fluid to the exhaust gas, and a catalytic converter in the exhaust gas duct for converting a noxious substance by using the fluid, a device for controlling the combustion system and for catalytic removal of the noxious substance from the exhaust gas, comprising:

a device for determining a mass flow of the noxious substance;

a control line connected to the combustion system; and a control unit for forming a constant desired value for the mass flow of the noxious substance or a desired value for the mass flow of the noxious substance linearly dependent on at least one variable characterizing an operational state of the combustion system, said control unit connected to the device for the metered addition of the fluid and to said device for determining the mass flow, said control unit having a terminal connected to said control line, and said control unit regulating the mass flow for controlling the combustion of the combustion system corresponding to the desired value for the mass flow and for a metered addition of the fluid corresponding to the mass flow.

5. The device according to claim 4, wherein said device for determining the mass flow is a measuring device disposed in the exhaust gas duct upstream of the catalytic converter in flow direction of the exhaust gas.

6. The device according to claim 4, wherein at least one of an air quantity and a fuel quantity to be fed to the combustion is adjusted through said control line.

7. The device according to claim 4, wherein at least one of an ignition time and a fuel feed time is influenced through said control line.

8. A combustion system, comprising:

an exhaust gas duct for conducting exhaust gas;

a device for metered addition of a fluid to the exhaust gas;

a catalytic converter in said exhaust gas duct for converting a noxious substance by using the fluid; and a device for controlling the combustion system and for catalytic removal of the noxious substance from the exhaust gas, including a device for determining a mass flow of the noxious substance, a control line connected to the combustion system, and a control unit for forming a constant desired value for the mass flow of the noxious substance or a desired value for the mass flow of the noxious substance linearly dependent on at least one variable characterizing an operational state of the combustion system, said control unit connected to said device for the metered addition of the fluid and to said device for determining the mass flow, said control unit having a terminal connected to said control line, and said control unit regulating the mass flow for controlling the combustion of the combustion system corresponding to the desired value for the mass flow and for a metered addition of the fluid corresponding to the mass flow.

9. An internal combustion engine, comprising:

an exhaust gas duct for conducting exhaust gas;

a device for metered addition of a fluid to the exhaust gas;

a catalytic converter in said exhaust gas duct for converting a noxious substance by using the fluid; and a device for controlling the internal combustion engine and for catalytic removal of the noxious substance from the exhaust gas, including a device for determining a mass flow of the noxious substance, a control line connected to the internal combustion engine, and a control unit for forming a constant desired value for the mass flow of the noxious substance or a desired value for the mass flow of the noxious substance linearly dependent on at least one variable characterizing an operational state of the internal combustion engine, said control unit connected to said device for the metered addition of the fluid and to said device for determining the mass flow, said control unit having a terminal connected to said control line, and said control unit regulating the mass flow for controlling the combustion of the internal combustion engine corresponding to the desired value for the mass flow and for a metered addition of the fluid corresponding to the mass flow.

* * * * *